(12) United States Patent
Brown

(10) Patent No.: US 9,534,699 B2
(45) Date of Patent: Jan. 3, 2017

(54) LOWER EFFORT QUICK-CONNECT COUPLER

(71) Applicant: Gregory James Brown, De Winton (CA)

(72) Inventor: Gregory James Brown, De Winton (CA)

(73) Assignee: GENESIS TECHNOLOGY INC. (CA)

( * ) Notice: Subject to any disclaimer, the term of this patent is extended or adjusted under 35 U.S.C. 154(b) by 0 days.

(21) Appl. No.: 14/281,721

(22) Filed: May 19, 2014

(65) Prior Publication Data

US 2014/0345712 A1    Nov. 27, 2014

Related U.S. Application Data

(60) Provisional application No. 61/825,905, filed on May 21, 2013.

(51) Int. Cl.
*F16K 15/00* (2006.01)
*F16K 1/18* (2006.01)
*F16L 37/42* (2006.01)

(52) U.S. Cl.
CPC ............. *F16K 15/00* (2013.01); *F16L 37/42* (2013.01); *F16K 1/18* (2013.01); *Y10T 137/7854* (2015.04); *Y10T 137/7856* (2015.04)

(58) Field of Classification Search
CPC .............. F16K 15/00; F16K 1/18; F16K 1/20; F16L 37/42; Y10T 137/7854; Y10T 137/7856; Y10T 137/7909; Y10T 137/7898; Y10T 137/79; Y10T 137/7901
USPC ........ 251/149.1, 149.2, 149.3, 149.8; 600/579
See application file for complete search history.

(56) References Cited

U.S. PATENT DOCUMENTS

| | | | | | |
|---|---|---|---|---|---|
| 2,518,299 | A | * | 8/1950 | Fernandez | F25B 41/003 137/15.09 |
| 3,127,148 | A | * | 3/1964 | Collar | F16L 29/007 137/527 |
| 3,285,627 | A | * | 11/1966 | Kozulla | F16K 15/144 251/149.2 |
| 4,123,089 | A | * | 10/1978 | Viero | F16L 37/084 137/329.1 |
| 4,586,694 | A | * | 5/1986 | Jones | F16L 37/38 251/149.2 |
| 4,856,823 | A | * | 8/1989 | Heren | F16L 37/084 137/533.17 |

(Continued)

*Primary Examiner* — Mary McManmon
*Assistant Examiner* — Frederick D Soski

(57) ABSTRACT

A sealing member, whose unique manner of movement provides an improvement to a quick-connect valve assembly, for fluid control. A coupling force, required to couple the quick-connect valve assembly, containing the sealing member, is substantially reduced, resulting in an improvement to a typical quick-connect valve assembly (prior-art). The quick-connect valve assembly is comprised of at least a male coupler, a female coupler and the sealing member. During the resultant coupling, the sealing member's features ensure that said sealing member is firstly moved in a rotational manner and then secondly, if desired, in a more typical translational manner. The sealing member design allows backward compatibility with the typical quick connect valve assemblies. This backward compatibility allows a simple one-part replacement of a typical sealing member (prior-art) with said sealing member in order to benefit from this improvement.

1 Claim, 8 Drawing Sheets

(56) References Cited

U.S. PATENT DOCUMENTS

| | | | | |
|---|---|---|---|---|
| 4,877,219 | A * | 10/1989 | Yano | F16L 37/38 |
| | | | | 251/149.2 |
| 5,044,401 | A * | 9/1991 | Giesler | F16L 37/32 |
| | | | | 137/614.03 |
| 5,613,663 | A * | 3/1997 | Schmidt | A61M 39/26 |
| | | | | 251/149.2 |
| 5,725,516 | A * | 3/1998 | Cook | A61M 1/0001 |
| | | | | 600/581 |
| 5,787,927 | A * | 8/1998 | Johnson | F16L 37/23 |
| | | | | 137/614.02 |
| 6,161,578 | A * | 12/2000 | Braun | F16L 37/0841 |
| | | | | 137/614.03 |
| 6,978,800 | B2 * | 12/2005 | deCler | F16K 15/026 |
| | | | | 137/538 |
| 7,481,243 | B2 * | 1/2009 | Michaels | A61M 1/0001 |
| | | | | 137/892 |
| 7,631,660 | B2 * | 12/2009 | deCler | A61M 39/18 |
| | | | | 137/614.03 |
| 2006/0108556 | A1 * | 5/2006 | Rose | F16K 15/20 |
| | | | | 251/149.8 |
| 2010/0044609 | A1 * | 2/2010 | Matsubara | F16K 15/026 |
| | | | | 251/149 |

\* cited by examiner

PRIOR-ART

PRIOR-ART

PRIOR-ART

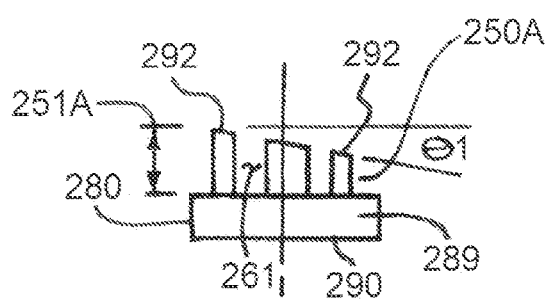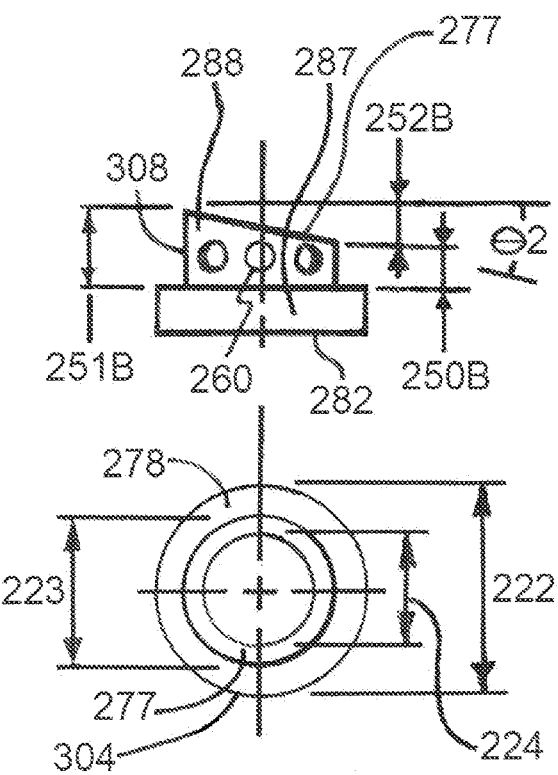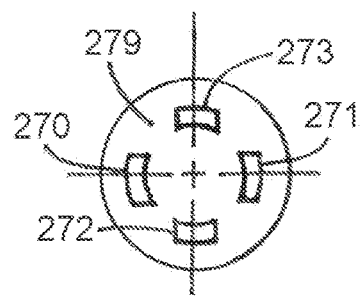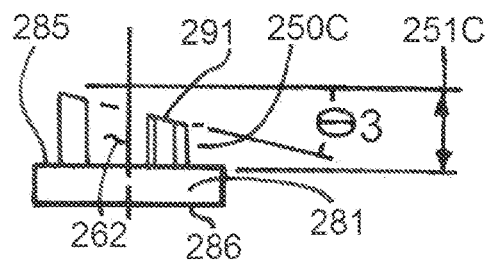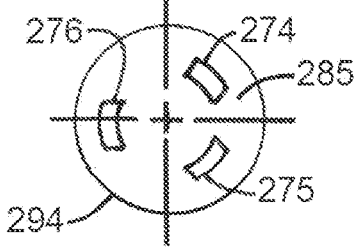
FIG. 4A  FIG. 4B
FIG. 4C

LOWER EFFORT QUICK-CONNECT COUPLER

BACKGROUND OF THE INVENTION

The design functionality of a typical quick-connect valve assembly (prior-art) utilizes other commercially-available standard components where some, although not all, components are necessary for the new design to function. The typical quick-connect valve assembly may also be referred to as a quick-disconnect coupler, or a quick disconnect coupler, or a quick-disconnect, or in other similar ways. The typical quick-connect valve assembly components are detailed and labeled in FIGS. 1 to 3. In particular, two components from pre-existing commercially available designs are utilized in this invention in order to ensure a practical and functioning typical quick-connect valve assembly: 1) a radial "seal" between a typical male coupler 203 and a typical female coupler 204 and, 2) a "stop and lock" or "lock" that restricts engagement and locks the typical male coupler and the typical female coupler together under full engagement of the typical quick-connect valve assembly. The term "typical" is utilized in naming prior-art components in this specification.

Typical quick-connect valve assemblies are in widespread use for reliably joining fluid transfer lines, gas transfer lines and pneumatic transfer lines. Generally, an automatic shut-off value (a check valve) is incorporated, commonly called a direct response valve. A typical sealing member (prior-art) acts as the direct response valve and hence eliminates the need for a separate shut-off valve that would have to be actuated prior to the uncoupling process. Hence the purpose of the direct response valve utilized within the typical quick-connect valve assembly is to eliminate undesirable leakage during disengagement (uncoupling). Typical quick-connect valve assemblies use many variations of locking mechanisms to automatically lock the two male and female components together so the user avoids needing to manually hold the two components of the coupler together while fluid is flowing, thus supporting practicability. The methods of locking are varied and numerable. The type of locking features of the typical quick-connect valve assembly is not of material relevance to this discussion due to the fact that any manner of locking is merely to provide convenience to the user.

In addition, this type of direct response valve contains some form of the typical sealing member which is commonly contained within in the typical female coupler (prior-art) and this component can take many different shapes. The primary features of the design of the direct response valve are that: 1) it must comprise a smaller size than the inside annular cavity of the typical female coupler 221 and, 2) the typical sealing member 210 sealing surface 214 must closely match in a circumferential manner the same axial shape of sealing surface 215 of the mating female coupler 204. The joining of surfaces 214 and 215 provides a typical fluid seal. In practice, the typical fluid seal is accomplished by utilizing detailed readily available forms and shapes and materials and can be manufactured from a separate and pliable rubber material or a hard material, though, the typical fluid seal material is in practice much more deformable than the parent female and male bodies, in order to ensure that sealing occurs.

A typical radial seal is required that creates a seal between the outer portion of the typical male coupler's smaller end 213 and the inner diameter of the typical female coupler 204 in order to prevent fluid communication out of the assembly, which is commonly referred to as a "leak". So in practice the typical radial seal also ensures that the quick-connect valve assembly functions and hence fluid flows between the typical female coupler and the typical male coupler only and does not "leak" out of the assembly.

In the past, a number of typical quick-connect valve assemblies have utilized a typical direct response valve, whereby the typical sealing member is caused to open by the insertion of the typical male coupler 203 and the resultant axial movement 910 of the typical sealing member 210 (assuming that the typical female coupler 204 remains stationary herein unless otherwise specified). In typical designs, the forward surface of the typical male coupler (prior-art) 217 (which is of uniform height in the axial direction 910) communicates with the raised surface 216 of the typical sealing member 210, thus causing the typical sealing member 210 to translate in a purely-axial manner (where no rotation occurs). Hence the typical sealing member 210 and the typical male coupler 203 move together (in tandem) in direction 910.

Prior-art direct response valves' (also referred to as check valves; said typical direct response valve) are disclosed in Applicant's previous U.S. Pat. Nos. 8,561,640 B2; 5,005,602; 4,712,575; 4,776,369; 7,334,603; 6,978,800 and 8,596,560 B2. These prior-art disclosures incorporate only a purely-axial movement of the typical sealing member, relative to the direct response valve body (titled the typical quick-connect valve assembly above). In other words, these prior-art disclosures state that the sealing surfaces' (of the typical sealing member) move the same amount, providing a uniform circumferential opening at all locations between the sealing surfaces. Since the typical sealing member is translating purely-axially against the resisting fluid pressure (contained within central chamber(s) of the female body), this means that the required magnitude of a typical coupling force (of insertion of the typical male coupler) is a result of the fluid pressure as it is applied to the entire resisting surface of the typical sealing member; dissimilar to this invention.

Prior-art direct response valves (also referred to as check valves; said typical direct response valve) are disclosed in Applicant's previous U.S. Pat. Nos. 6,622,205; 5,941,278; 7,533,693 and 5,117,514 which incorporate only a pure rotational means of opening said typical direct response valve and utilize various styles of sealing members with a fixed rotational movement and also with a mechanical pivot, hence such elements are distinctly different than those in this submission. In addition, prior-art valves are not pure inline direct response (check) valves, as in this submission, although these prior-art valves may be used as the check valve in their engaged positions.

Prior-art direct response valves' (also referred to as check valves; said typical direct response valve) are disclosed in Applicant's previous U.S. Pat. Nos. 5,501,427(251/228); 5,620,015 and 4,561,630 and all provide a variety of both typical sealing member physical rotation and the typical sealing member physical translational aspects in their designs; although all of these prior-art submissions incorporate dramatically different mechanism design elements in order to facilitate their sealing member's rotational and axial movements. All prior-art submissions incorporate various combinations of the following elements, in order to create the rotation and translation of their sealing member(s), including: a) complex mechanisms, pivots, levels, cams, wheels, latches and b) sliding, movably connected, pressure trips, lost motion and slides. The prior-art submissions are dramatically different than the current submission since prior-art submissions utilize the above stated elements to facilitate rotation and translation whereas, this invention and the sealing member movement is initiated in a unique manner from previous methods. In addition Applicant U.S. Pat. No. 5,620,015 is specially designed for use as a pipe end valve only and is not considered a pure direct response valve due to the mechanisms utilized in its design. Applicant U.S. Pat. No. 5,501,427 is specifically intended as a shut-off and flow regulation valve and is not said direct response valve in its dis engaged position. Lastly, applicant U.S. Pat. No. 4,561,630 is specifically intended as an extended period shut-off valve and is not said direct response valve in its dis engaged position.

Prior-art direct response valves (also referred to as check valves; said typical direct response valve) are disclosed in Applicant's previous U.S. Pat. No. 8,348,661 which incorporate true rotation of the typical sealing member about its longitudinal shaft axis only and no rotation of the typical sealing member occurs.

BRIEF SUMMARY OF THE INVENTION

This invention relates to a sealing member whose unique features result in an improvement of the typical quick-connect valve assembly that utilizes the typical sealing member. This invention of a quick-connect valve assembly is unique in that it is designed to ensure that the sealing member is firstly moved by a rotation and then secondly, if desired, by a translation further in the axial direction. The initial said rotation (not movement by axial translation as in prior-art) of the sealing member provides an advantage over prior-art designs in that not all the resisting pressure (contained within the central chamber of the female body) needs to be overcome, during the coupling action, and this improvement results in a coupling force which is substantially less than the typical coupling force. As compared to prior-art submissions, this invention provides distinctive functional advantages, for use by humans by substantially reducing the coupling force.

A fluid channel opening of the direct response valve is initiated by the insertion of a male coupler into a female coupler. The female coupler contains said sealing member which incorporates a dihedral angle D1, which ensures that the sealing member initially moves in a rotational manner. At the outset a fluid seal exists between the sealing member and the female coupler. The initial fluid opening occurs between the surfaces of the female coupler and the sealing member and the first fluid opening location occurs at a singular circumferential location, due to the rotational manner of opening. This opening initiates fluid communication from a central chamber of the female coupler into a second central chamber of the male coupler. As the male coupler is inserted further, the fluid opening extends past a singular circumferential location and the sealing member continues to rotate further as the male coupler is inserted further. After the rotation of the sealing member has been completed, the sealing member if desired, is then translated in a more typical translational manner (although the sealing member remains in its previously rotated position) further, opening the fluid channels and thus improving the amount of fluid communication. If desired, the male and female coupler can be held together, in the coupled position, by the use of any commercially available locking mechanisms. Also, the fluid seal between the sealing member and the female coupler can be provided by commercially existing means such as flexible materials, O-ring's, precision machining or any other desired methods.

BRIEF DESCRIPTION OF THE DRAWINGS

FIGS. 4A, 4B and 4C are the plan and side views of three alternative designs of the sealing members'.

FIGS. 8A, 8B and 8C are titled Position 2, Position 3, and Position 4 respectively.

DETAILED DESCRIPTION OF THE DRAWINGS

Figure 1:
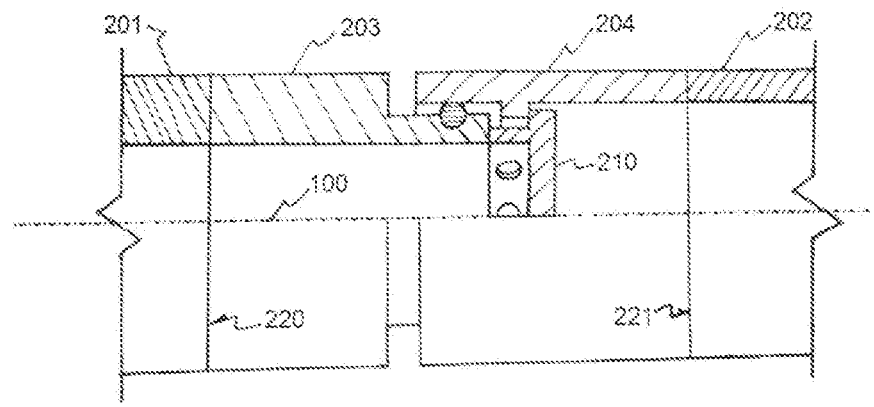
FIG. 1 is prior-art and is a block view in partial section of the typical quick-connect valve assembly.

FIG. 1 is prior-art and is a block view in partial section of the typical quick-connect valve assembly which incorporates the typical male coupler 203, the typical female coupler 204, the typical sealing member 210 and other typical components (a radial seal, tubes/hoses 201 and 202). The typical quick-connect valve assembly incorporates the typical sealing member 210 providing an integral valve function which is said direct response valve class of valves. The typical quick-connect valve assembly is depicted in a closed state of a typical valve. The position and the style or type of the exact typical sealing member 210 shown is insignificant and FIG. 1 is simply displayed for comparison purposes only. FIG. 1 does not depict or represent the required elements of the invention claimed; rather it is included as a block diagram representation which will provide a basis and framework for more detailed elaboration. FIG. 1 also outlines the interfaces between typically utilized fluid transmission hoses 201 and 202 (tubes or pipes) that are connected to both ends of the typical quick-connect valve assemblies.

Figure 2:
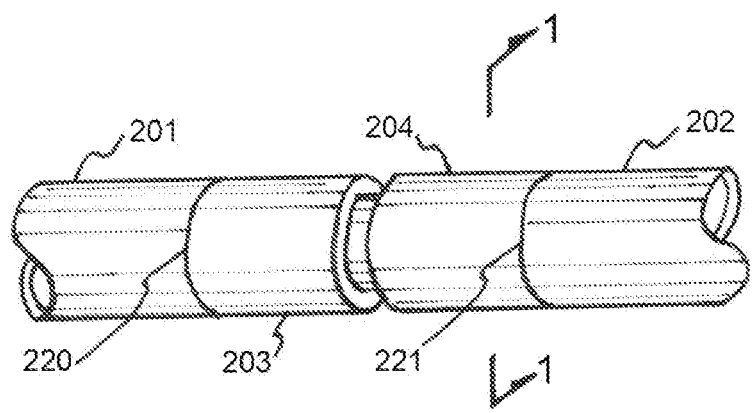
FIG. 2 is prior-art and is an external view of the typical quick-connect valve assembly as shown in FIG. 1.

FIG. 2 is prior-art and is a view of the typical quick-connect valve assembly and other prior-art components which are only visible from an external view. Both the prior-art designs and this new design of quick-connect valve assemblies appear similar from an external perspective. This block external view of the typical quick-connect valve assembly also shares the typical hoses 201 (tubes or pipes; 201 and 202) as shown in FIG. 1.

Figure 3:
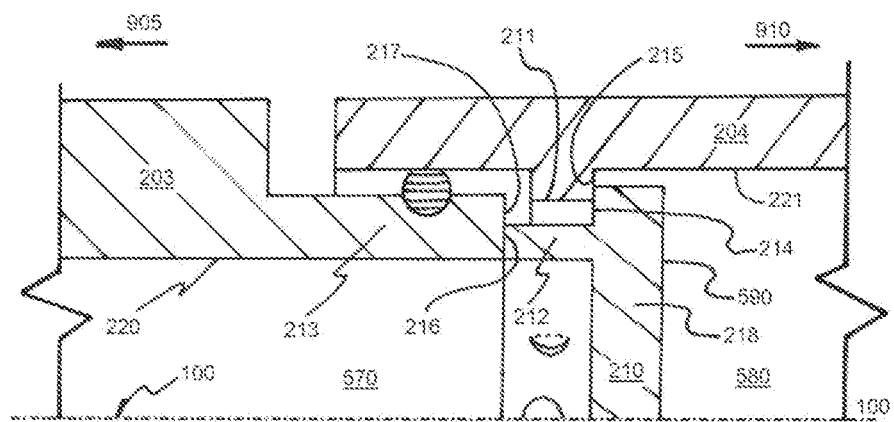
FIG. 3 is prior-art and is a sectional view of the typical quick-connect valve assembly taken along section 1-1 of FIG. 2.

FIG. 3 is prior-art and is a sectional view taken along section 1-1 of FIG. 2. The typical direct response valve is shown here so that the components and surfaces can be clearly seen. FIG. 3 also contains other components of the typical direct response valve, therefore demonstrating the basis upon which improvements to the typical sealing member of said typical direct response valve are made and described herein for this invention. The typical quick-connect valve assembly is depicted in the closed state of the typical valve.

The typical direct response valve incorporates the typical sealing member where all points on surface 214 and all points on surface 216 describe two distinct planes in space and whereas these two planes defined are in fact parallel planes. In other words, there is no intentional or substantial angle between the plane defined by surface 214 and the plane defined by surface 216 by design or in practice. However, there may be a small unintentional angle that exists between surface 214 and surface 216 due to manufacturing deviations and the tolerance of manufactured parts.

During physical engagement the typical male coupler 203 moves in direction 910 where the typical male coupler 203 contacts the typical sealing member 210 at surfaces 217 and 216, respectively. The movement in direction 910 assumes that the typical female coupler 204 is stationary, although the reverse of this movement is also possible; where the typical female coupler 204 moves in direction 905 and the typical male coupler 203 is considered stationary. FIG. 3 depicts the position where the typical male coupler 203 has been inserted into the typical female coupler 204 at the exact position where there is full contact between the typical male coupler 203 and the typical sealing member 210; where surfaces 215 and 214 remain in full contact and hence FIG. 3 depicts the valve in the closed state of said typical valve. During the closed state of the typical valve a static pressure condition exists within internal central chambers 580.

Any further movement of the typical male coupler 203 and hence the typical sealing member 210 in direction 910 would result in surface 214 and 215 no longer being in contact with each other and hence the typical fluid seal is broken between these surfaces, this would result in the valve now being in a partially-open state of the typical valve. In other words, this resultant seal break (between surface 214 and surface 215) results in a communication of fluid between internal central chamber 580 into central chamber 570. This communication of fluid continues to improve as the physical distance between surface 215 and surface 214 is increased and finally reaches a fully-opened state of the typical valve.

In the typical quick-connect valve assemblies, there is no intentional angle between surfaces 214 and 216 (being on parallel planes), hence the typical sealing member 210 moves only in an axial manner in direction 910 (or direction 905); therefore, there is no intentional or meaningful rotation of the typical sealing member 210 relative to the typical female coupler 204 (or the typical male coupler 203 or about axis 100) during the valve opening process (the valve's state change). Since there is no rotation of the typical sealing member in the typical design, the typical coupling force required to reach the partially-open state can be calculated as the static pressure in central chamber 580 multiplied by the area of surface 590. At the coupling position just prior to the partially-open state (of the typical valve) the typical coupling force is at its highest magnitude.

In the prior-art direct response valves the pressure which exists in central chamber 570 is, in practice, a smaller amount relative to the pressure which exists in the central chamber 580. The pressure in central chamber 570 is assumed to be a low value approaching atmospheric pressure, hence only the absolute pressure in central chamber 580 is of any significance.

The quick-connect valve assembly has two coupling parts the male coupler and the female coupler, which are capable of being coupled together during a coupling process or detached from each other during a uncoupling process. The quick-connect valve assembly provides the means to ensure that the sealing member is firstly moved by rotation and then secondly, if desired, moved in a more typical translational manner. Following the initial rotational phase, the sealing member now undergoes translation in an axial direction, although remains in its previously rotated position. The rotation and the translation of the sealing member provides the valve functionality of the direct response class of valve and hence opens internal fluid flow channels, providing fluid communication through the quick-connect valve assemblies said central chamber(s). One primary function of the quick-connect valve assembly, which incorporates this direct response valve, is to provide a valve state change during operation. As detailed herein there are three particular states of said valve: closed, partially-open or fully-opened. The female coupler contains said central chamber where one annular surface provides the sealing surface when in contact with the sealing member. An annular surface located on the upstream side of the sealing member provides the sealing surface when in contact with the female coupler.

During the resultant coupling, the dihedral angle D1 ensures that the sealing member is firstly moved by the rotation and then secondly, if desired, by said translation further in the axial direction. The sealing member may incorporate the dihedral angle which ensures the sealing member undergoes the rotation during the coupling of the quick-connect valve assembly. The upstream plane, located on the upstream side of the sealing member where said upstream plane is coincident with said sealing surface plane. The sealing member contains any number of protrusions on it's downstream side where a subset of these protrusions participate in defining the downstream plane. These participating protrusions can take the physical form of the protruding member or the protruding solid body in any quantity or in any combination of both physical forms. The downstream plane, located on the sealing member which is coincident with the downstream ends' of the participating protrusion's (said protruding members' or said protruding solid bodies' or the combination of both). The dihedral angle D1 is the angle between the downstream plane and the upstream plane.

This new design provides the means to ensure that the sealing member initially rotates, when the male coupler is inserted, by way of an improvement in the design of the sealing member. FIGS. 4A and 4C are two alternative designs of the sealing member, which contain unique features, namely the protruding members' which ensure that there is the fore mentioned said dihedral angle between the downstream plane and the upstream plane. The dihedral angle ensures that the rotation of the sealing member occurs, during the coupling process.

FIG. 4B depicts only one alternative of utilizing the protruding solid body that is protruding from the sealing surface 278. The dihedral angle Theta2 ensures that the sealing member firstly rotates during the valve opening sequence.

FIG. 4A is the plan and side view of one alternative method of designing the sealing member 261. This alternative design incorporates four said protruding members', namely 270, 271, 272 and 273. The downstream ends' of these four said protruding members' define a flat plane, or surface 292—the downstream plane. The downstream plane (surface 292 in this alternative) is at the dihedral angle Theta1 relative to the upstream plane (the plane defined by surface 279). An alternative design may also incorporate less than four said protruding members' as shown in FIG. 4C, whereby containing three said protruding members'. More than four of the protruding members' may also be incorporated into the design, although no design considerations above three or four said protruding members' provide any known practical advantages, as a plane can be uniquely defined by the location of the minimum of three points in space.

FIG. 4B is the plan and side view of a second alternative design of the sealing member 288. This design, as detailed in FIG. 4B, does not have any distinct and separable said protruding member as compared to the alternative designs in FIGS. 4A and 4C. This second alternative design of the sealing member 288 incorporates the protruding solid body where the plane defined by the sealing surface 278 represents the upstream plane and where surface 277 represents the downstream plane.

This second alternative design depicted in FIG. 4B of the sealing member 288 incorporates the protruding solid body and a sliced hollow cylindrical shape has been arbitrarily chosen in this embodiment. The sliced hollow cylindrical shape contains an interior surface 306 and exterior surface 308 with the hollow cylindrical shape being attached at one end to surface 278. The interior surface 306 of the protruding cylinder is defined by the interior diameter 224, and the outer surface 308 is defined by the exterior diameter 223. It is necessary in this second alternative design, that transverse holes be located on the cylinder to accommodate fluid flow between the radial inner and outer surfaces of the sliced hollow cylinder. As depicted in FIG. 4B, the second alternative design of the sealing member 288 also incorporates a number of round transverse holes 260, although the shape of the holes is not restricted to round-shaped holes only. In practice, transverse holes 260 of any shape, or quantity, can be utilized as long as the resultant total cross-sectional area of all holes is sufficient to allow desired fluid flow quantities. The protruding solid body, being a protruding cylinder in this example (diameter 223 and 224) may also take an irregular or non-cylindrical shape, although it must also have some form of transverse holes 260.

Any alternative chosen shape of the protruding solid body must also incorporate the following interference requirements: a) during operation, surface 308 must not interfere with the interior surface 305 (see FIG. 6.), as the sealing member rotates and/or translates and, b) during operation, surface 304 must not interfere with the female coupler (and interior diameter 560) as defined by surface 301, as the sealing member rotates and/or translates during operation.

Figure 6:
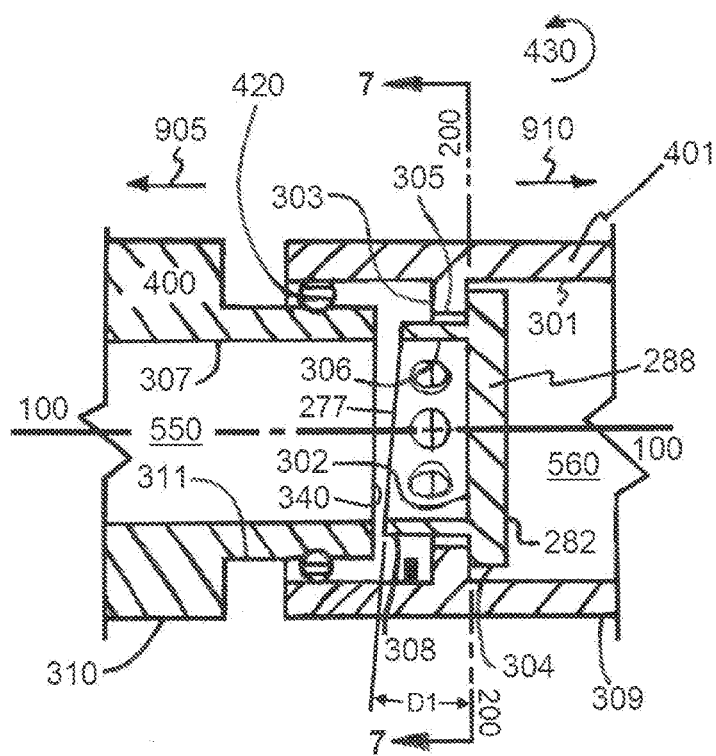
FIG. 6 is sectional view of the quick-connect valve assembly taken along section 4-4 of FIG. 9 incorporating one alternative of the sealing member. This view is titled Position 1.

All of afore mentioned interference requirements are also applicable for all alternative designs depicted by FIG. 4A and FIG. 4C, where the external radial surfaces of the protruding member (as a system) comprises the elements which must not interfere with surface 305 (see FIG. 6). In addition, these interference requirements also apply to any and all possible designs of the sealing member's, that meet the requirements of this invention.

FIG. 4C is the plan and side view of a third alternative design of the sealing member which incorporates three distinct and separate said protruding members', specifically 274, 275 and 276. The downstream ends' of three said protruding members' define surface 291—the downstream plane. The downstream plane (surface 291) is at the dihedral angle Theta3 relative to the upstream plane (the plane defined by surface 285). It is possible that this third alternative design may contain more than three protruding members, as shown in FIG. 4A, although there are only three participating said protruding members' as some of the protruding members' may not participate in defining the dihedral angle. There are various reasons why some of the protruding members' may not participate in defining the dihedral angle. The simplest to visualize is where the protruding member, relative to the group, is shorter in its effective height (see 253 in FIG. 5B). It is therefore possible that some of the protruding members' may not participate, although only the protruding members' which participate in defining the downstream plane are illustrated herein. And by definition, only the protruding member(s) which participate in defining the downstream plane are termed the protruding member herein.

In concept, a fourth alternative design, which is not depicted herein, could also incorporate two (or in theory, one) protruding member, diametrically opposed, which would provide a high point (similar to 251B of design in FIG. 4B) and a low point (similar to 250B of design in FIG. 4B). This fourth alternative design may not be practical, as in practice may be unstable, due to the fact that two points do not define a plane. It is possible that one or both of the protruding member ends may have sufficient width (in the circumferential direction) to provide the three required points, although this fourth method of design would generally be considered undesirable in practice. However, if the one or two protruding member(s) are of sufficient radial and circumferential extents, they may provide the required means of function as they will have similar attributes of the protruding solid body detailed above.

Figure 8:
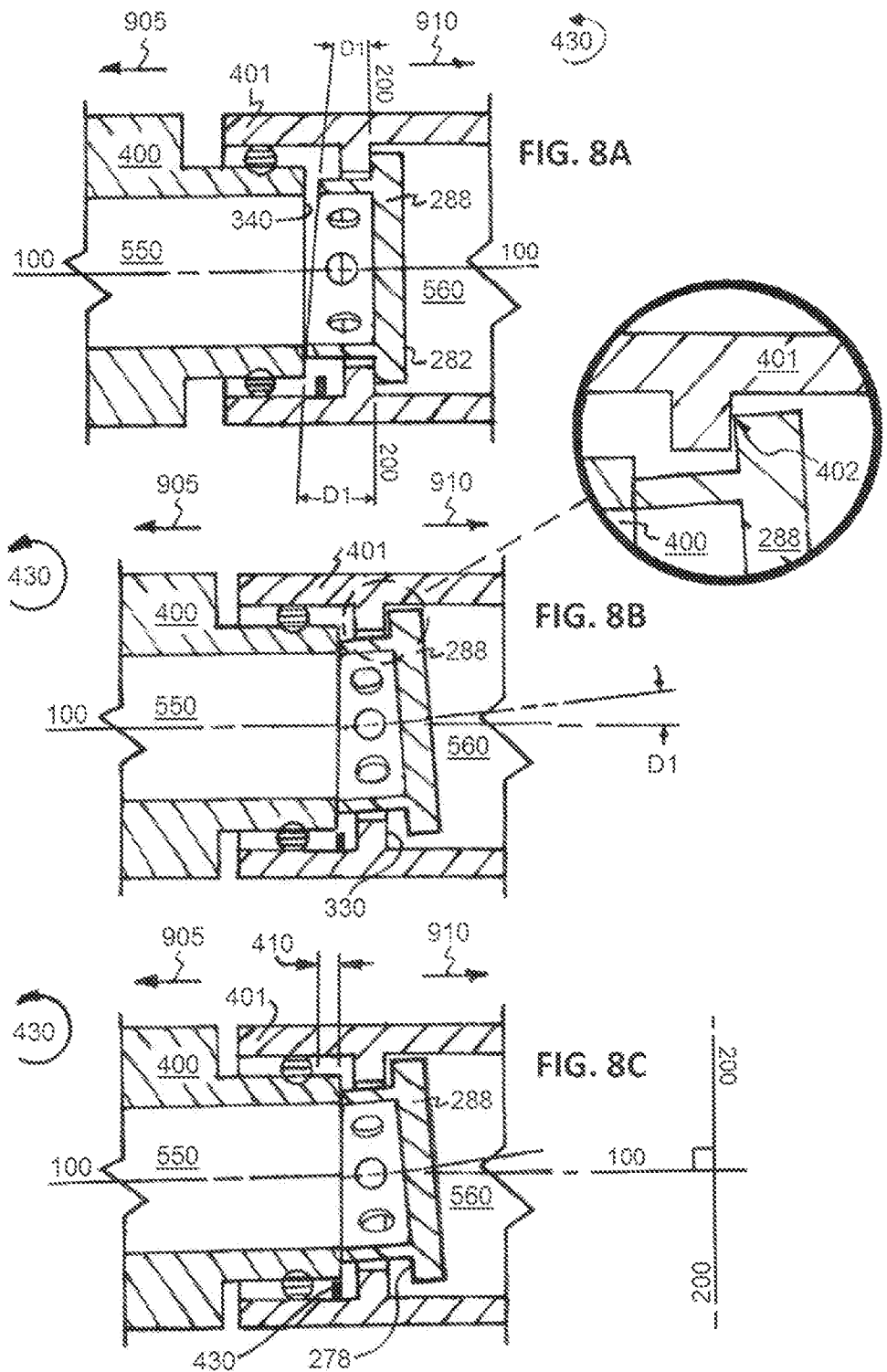
FIGS. 8A, 8B and 8C are sectional views along line 4-4 of FIG. 9 showing the components at three distinct positions of engagement of the quick-connect valve assembly.

The format utilized in this paragraph is as follows: "FIG. 4B labels [FIG. 4A labels; FIG. 4C labels]". The actual seal utilized between surface 278 [surface 279; surface 330] and surface 330 [330; 330] as detailed in FIG. 6 and FIG. 8 are considered prior-art, and as such are shown in a non-detailed and pictorial fashion only. The seal utilized may be one of a) a standard O-ring design, b) flat pliable seal design, c) a seal which relies on conforming materials, d) precision machining or any other methods as desired. The choice of a prior-art seal will have an effect on the current inventions performance. If an appropriate said prior-art seal is chosen, its effect will be minimal, as compared to the benefits of this invention; whereas if an inappropriate the prior-art seal (magnets, fasteners, clasping features for example) is chosen, it may have an adverse effect on the intended benefits of this invention.

The format utilized in this paragraph is again as follows: "FIG. 4B labels [FIG. 4A labels; FIG. 4C labels]". All alternative designs, of the sealing member will incorporate said high point (as in example 251b [251a; 251c]) and said low point (as in example 250b [250a; 250c]), which in turn defines the downstream plane and the dihedral angle Theta2 [Theta1; Theta3] as depicted in FIG. 4B [FIG. 4A; FIG. 4C]. The circumferential location of the high point and the low point is not critical, although the high point and the low point should be diametrically opposed. Their location is to ensure the creation of the dihedral angle Theta2 [Theta1; Theta3]. Note that some of these additional points may be redundant (no participation in any improved function of the invention) and any redundant points will not improve the function of rotating of the sealing member 288 [261; 262]. Of lesser importance is that these additional said high points' and said low points' (redundant points) may also hamper the consistent and predictable rotation of the sealing member 288 [261; 262].

Figure 5A:
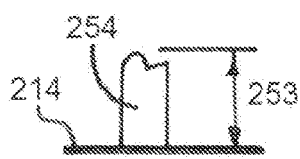
FIGS. 5A, 5B and 5C are alternative depictions of a protruding member.
Figure 5B:
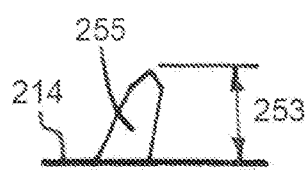
Figure 5C:
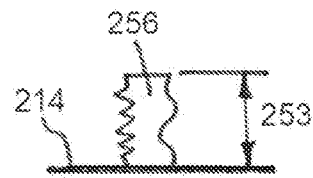

FIG. 5A is the side view of one alternative shape of the protruding member 254 which may be incorporated into this design. FIGS. 5A through 5C are specifically provided to demonstrate that the protruding member can take various shapes. FIG. 5A also depicts a effective height 253 of the protruding member 254, perpendicular to surface 214. One end of the protruding member 254 is solidly connected to and is an integral part of surface 214. These three examples (depicted in FIGS. 5A, 5B and 5C) indicate that said effective height 253 of all three said protruding member are identical regardless of their shape; their top surface details or their side details.

Other alternatives (not depicted) include the use of a combination of both said protruding members' and said protruding solid bodies' to provide the required means of functionality desired by the sealing member.

Figure 9:
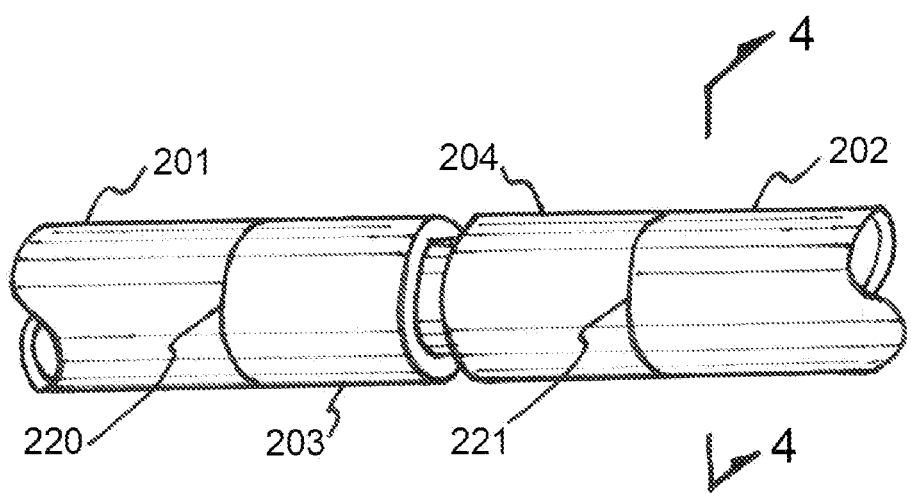
FIG. 9 is an external orthographic block view of the quick-connect valve assembly.
Figure 10:
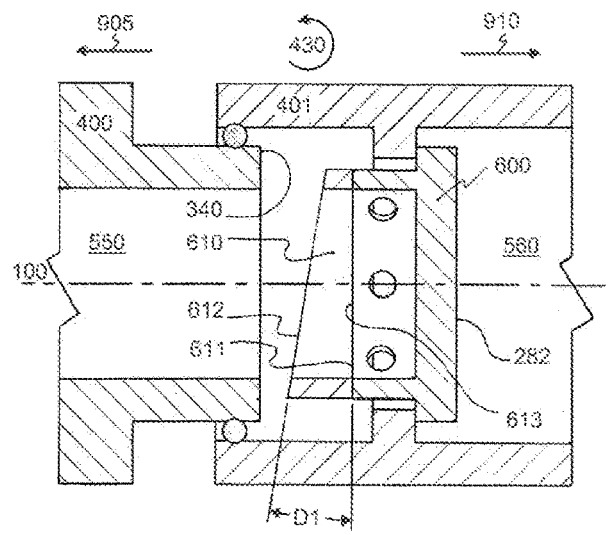
Figure 10:
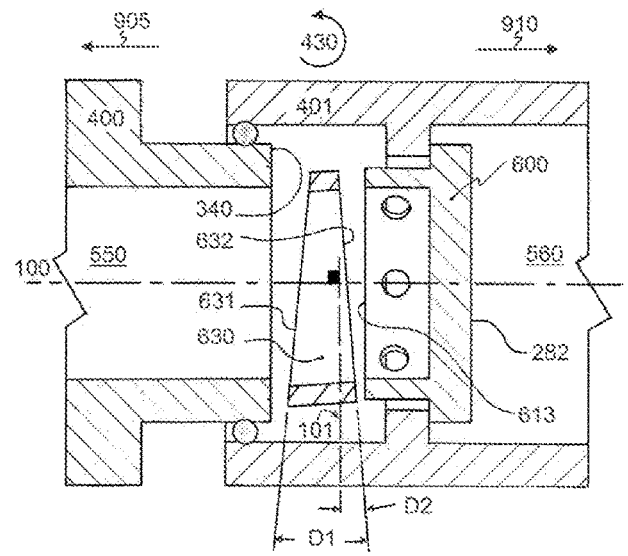
Figure 10:
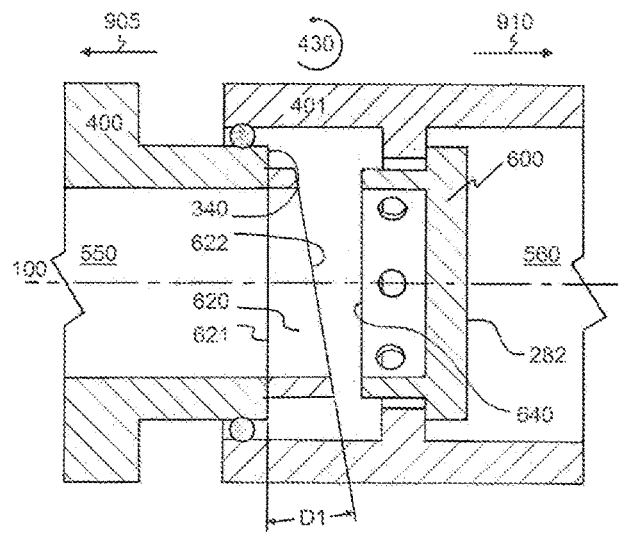

FIG. 6 is an magnified view in section taken along section 4-4 of FIG. 9, incorporating one alternative of the sealing member that is detailed in FIG. 4B. In FIG. 6, the sealing member is oriented in the position prior to any movement of the sealing member. FIG. 6 is titled Position 1 and depicts the male coupler 400 in its pre-contact position where no contact exists with the sealing member 288 and where the valve is also in the closed state of the valve. The dihedral angle D1 is also depicted. The sealing member design alternative of FIG. 4B is chosen only for simplification and ease of explanation, as its geometry (a sliced hollow cylindrical shape) is the most clearly displayed. As depicted in FIG. 6 the Direction 910 and Direction 905 are also defined as a upstream direction and a downstream direction, respectively. The downstream direction is the direction of fluid flow in the quick-connect valve assembly.

Figure 7:
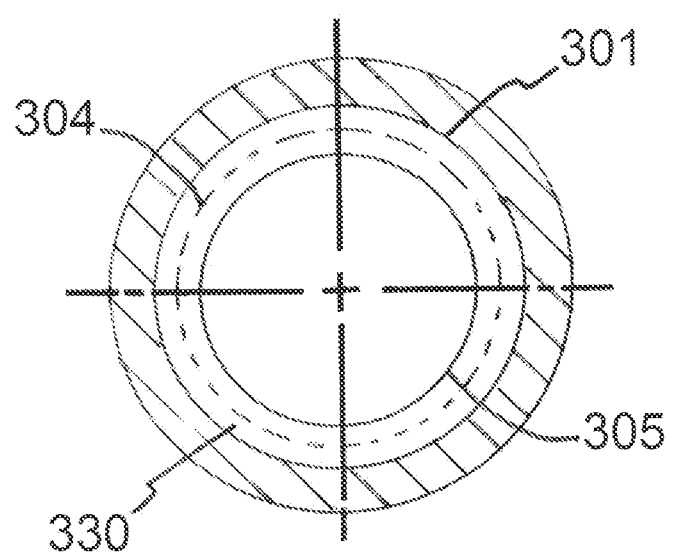
FIG. 7 is a cross sectional view taken along line 7-7 of FIG. 6 which details an sealing surface.

FIG. 7 is a cross sectional view taken along section 7-7 of FIG. 6. The purpose of this figure is to depict the respective sealing member and the female coupler sealing surface in plan view. The sealing member has been removed from this figure in order to provide clarity. This figure uses FIG. 8 components and depicts that a sealing area (the actual sealing surface only) is defined by the area that is formed between the: (1) larger circle (displayed with a dotted line) created as the extent of surface 304 as projected onto the female coupler 401 surface 330 and (2) smaller circle as defined by the smallest circle shown in FIG. 7 (which is the side view of surface 305). The surfaces 305 and 304 are shown in FIG. 7 as circular, which is only one of the typical and practical shapes that these surfaces may take, as they are not limited to circular shapes.

FIG. 6 and FIGS. 8A, 8B and 8C depict this invention in four operational positions, while detailing the rotation and the translation of the sealing member. The position, and the state of the valve is also depicted at each position. The four positions are as follows:

1) Position 1 is shown in FIG. 6, where the male coupler 400 in its pre-contact position and there is no contact with the sealing member 288, and hence, the valve is in the closed state and, 2) Position 2 is shown in FIG. 8A, where the male coupler 400 in its initial first contact stage with the sealing member 288, while the male coupler 400 imparts no movement or said coupling force on the sealing member 288 and hence, the valve remains in the closed state (as in Position 1), and, 3) Position 3 is shown in FIG. 8B, where the male coupler 400 in its highest surface contact position (with the sealing member 288), and the sealing member 288 is also in a completely rotated position (rotated to the dihedral angle D1), and hence, the valve is now in the partially-open state and lastly, 4) Position 4 is shown in FIG. 8C, where the male coupler 400 in its final position, and hence, the valve is in the fully-opened state. The sealing member is fully rotated by the amount of the dihedral angle D1 and further translated 410 in directions 430 and 910 respectively.

Position 1 is shown in FIG. 6, where the male coupler 400 is in its pre-contact position and there is no contact with the sealing member 288 and hence the valve is in the closed state. Where FIG. 6 is a cross-sectional view of the quick-connect valve assembly, taken from section 4-4 of FIG. 9, incorporates the second alternative of the sealing member 288 (as shown in FIG. 4B) as part of the quick-connect valve assembly. This particular alternative of the sealing member 288 is incorporated in FIG. 6 merely for ease of explanation, as its particular geometry is most simple to display in a cross-sectional view. FIG. 6 also details the components, including: the male coupler 400, the female coupler 401, the sealing member 288 and lastly a depiction of a radial seal 420.

In Position 1, fluid pressure exists within the 560 central chamber (cavity) which is physically contained by surfaces 301, 282, 304 and 330 (FIG. 8B) and all of the surfaces of the typical hose 202 (as shown in FIG. 9). The pressure contained within the central chamber 550 (cavity) is assumed to be at a lower value (approaching atmospheric pressure) then pressure contained within chamber 560, so in practice the pressure that exists within chamber 550 is considered negligible. The higher value of pressure which exists in the central chamber 560 (cavity) causes movement of the sealing member 288 (in the direction 905) against the female coupler 401 and therefore, surfaces 330 (see FIG. 8B) and surface 278 (see FIG. 8C) are in direct contact (interfere) and provide a sealing area. Since surfaces 330 and surface 278 are in full interference (contact), the valve remains in the closed state. A plan view of the sealing area is explained in the description of FIG. 7 section.

Position 2 is shown in FIG. 8A, where the male coupler 400 is in its initial contact stage with the sealing member 288, hence the valve remains in the closed state as it was in Position 1. As shown in Position 2, the male coupler 400 is translated in direction 910 along axis 100 (during its insertion into the female coupler 401) from its original Position 1. The female coupler 401 is depicted as remaining stationary. At Position 2, the male coupler 400 initially contacts the sealing member 288, yet imparts no movement or said coupling force on the sealing member 288. The male coupler 400 makes initial contact with the sealing member 288 at the high point 251B (see FIG. 4B) of the sealing member 288. The male coupler 400 continues to translate further past Position 2 along axis 100 in direction 910 (during its continued insertion into the female coupler 401); this continued translation causes rotation of the sealing member 288 in direction 430, due to the one point contact between the high point 251B (see FIG. 4B) of the sealing member 288 and surface 340 (see FIG. 8A) of the male coupler 288. This rotation of the sealing member 288 in direction 430 is centred approximately around the rotation point 402, as detailed in the magnified visual of FIG. 8B. The rotation point 402 is located approximately at the outmost edge (top left hand corner) of the male coupler 288 (see FIG. 8B); this is when the outer edge of the male coupler 288 makes contact with surface 330 (see FIG. 8B and FIG. 7). The male coupler 288 makes contact with surface 330 at the rotation point 402 on the arc, where surface 278 (see FIG. 8C) and surface 304 (see FIG. 4B) meet. The exact location of the rotation point 402 is physically dependent on the style of the radial seal (O-ring or other methods) used, although the rotation of the sealing member 288 will generally occur around the same region of the rotation point 402, as depicted. Hence, the exact location of the rotation point 402 has no material effect on the overall function of this invention although the rotation point 402 must be approximately located as described here within. Any design modification of the rotation point away from the ideal location (diametrically opposed) and therefore approximately 180 degrees in the circumferential direction apart may decrease the effectiveness of this improvement.

As described herein, there exists a higher amount of pressure in the interior cavity 560 than the pressure that typically exists in the interior cavity 550, hence there is the static pressure differential, in direction 905 (in this case) across the sealing member 288. The static pressure differential is caused by the cavity 560 pressure applied to surface 282 in direction 905 (a higher amount) and the cavity 550 pressure applied to surface 302 in direction 910 (a lower amount approaching zero) which imparts a closing force onto the sealing member 288 in direction 905. Initially, in both Position 1 and Position 2, the closing force on the sealing member 288 in direction 905 is reacted (a force) by the female coupler reaction force (in the opposite direction; direction 910) exerted by the female coupler 401 over the sealing area (as detailed in description of FIG. 7 section). As the male coupler 400 is translated in direction 910 past Position 2, a initial contact occurs only at high point 251B (see FIG. 4B) of the sealing member 288 (see FIG. 8B) and surface 340 (see FIG. 8A) of the male coupler 400. The initial contact results in a transfer of some portion of the female coupler reaction force to surface 340 of the male coupler 400. As the male coupler 400 is further translated in direction 910, past its last position (described above), the amount of the female coupler reaction force exerted by the female coupler 401 is further decreased and hence more of the closing force is transferred to surface 340 of the male coupler 400.

The coupling force exerted by the male coupler 400 increases as the translation of the male coupler 400 continues further again in direction 910. The coupling force and the female coupler reaction force are both reactive forces. The amount of the coupling force exerted by the male coupler, continues to increase until a seal break angle (being considerably less than the dihedral angle D1) is reached and the valve enters the partially-open state, allowing fluid communication to occur between the central chamber 560 into the central chamber 550. Immediately prior to the sealing member 288 rotating to the seal break angle, the male coupler 400 and the female coupler 401 both impart approximately equal reaction forces (each reacts approximately half of the amount of the closing force) in direction 910, in order to react (resist) all of the closing force imparted by the sealing member 288 (in direction 905). In other words, the amount of the coupling force (in direction 910) plus the amount of the female coupler reaction force (in direction 910) is equal to the amount of the closing force (in the opposite direction 905) just prior to the seal break angle being reached. Immediately prior to the seal break angle being reached (as described above) there remains the static pressure differential (no fluid flow) across the sealing member 288 and it's at this position that the coupling force is at the highest magnitude, which exists at all positions. This improvement results in the highest magnitude of the coupling force being approximately half of the highest magnitude of the typical coupling force (prior-art); under similar pressure conditions (cavity 560 pressure minus cavity 550 pressure). Immediately after the seal break angle has been reached and fluid flow commences, coupling force decreases in value as compared to the static pressure differential stage (as described above) due to the Pressure-Volume characteristics of typical fluids.

The specific seal break angle is entirely dependent on the style and materials used in the typical seal design (an O-ring for example, is typically used) and on the physical geometry of the sealing member. Regardless of the typical seal design utilized, the description herein remains valid and the fluid communication simply starts at a unique and repeatable angle for that specific design—at the seal break angle.

Position 3 is depicted in FIG. 8B. The sealing member 288 thus continues to rotate in direction 430 until it reaches Position 3 (the orientation shown in FIG. 8B), where the sealing member 288 has rotated to its maximum amount possible angle D1 (the dihedral angle) and now surface 277 (see FIGS. 4A and 8B) of the sealing member 288 is coincident (interferes) with surface 340 (see FIG. 8A) of the male coupler 400. Also, at Position 3 (as detailed in the blow up of FIG. 8B) the sealing member 288 still remains in contact with surface 330 (see FIG. 7 description) at the rotation point 402. At Position 3 contact occurs at the interface between the sealing member 288 and the female coupler 401 (at the rotation point 402), and the value of the coupling force has decreased from its said highest magnitude. At Position 3 the closing force continues to ensure that the male coupler 400 and the sealing member 288 remain joined at the interface (surfaces 288 and 340). Any continued insertion of the male coupler 400, past Position 3 (FIG. 8B) results in both the male coupler 400 and the sealing member 288 (although the sealing member remains in its previously rotated position) now moving together by translation only (in the direction 910 along axis 100) and a two components now behaving as they are now one object.

The translation (secondary linear translation of the sealing member) is also unique in that the sealing member 288 is already rotated and then translated axially in an already rotated position along axis 100.

As, the two components are further translated past Position 3, in direction 910, the two components reach Position 4, as depicted in FIG. 8C. At Position 4 the translation of the two components ceases. At Position 4 the valve is depicted in the fully-opened state allowing an additional amount of fluid communication to occur from central chamber 560 and into central chamber 550. Any further translation of the two components is restricted by a typical stop 430 (FIG. 8C) and/or a typically integrated mechanism incorporating the typical stop 430 and a typical locking mechanism 430 (not depicted herein). The typical stop 430 and the typical locking mechanism 430, are only discussed as both features which are typical features included in most typical quick-connect valve assemblies, although neither are considered unique features of this new design. The fluid communication continues between Position 3 and Position 4 where the actual values of the closing force, the coupling force and fluid flow volumes are governed by the specific fluid's Pressure-Volume characteristics.

FIG. 9 is an external orthographic block view of the quick-connect valve assembly as detailed in FIGS. 6, 8A, 8B and 8C. As this is an external view of the quick-connect valve assembly with the typical hoses 201 (utilizing typical tubes or pipes), both the typical quick-connect valve assembly and the quick-connect valve assembly appear similar from an external perspective.

The improvement results in the highest magnitude of the coupling force being significantly less than the highest magnitude of the prior-art coupling force under similar operating conditions. The exact amount of improvement that can be achieved in practice can be confirmed by lab experiments and or simulations, by physical replacement of the typical sealing member (prior-art) with the sealing member.

Since, the highest magnitude of the coupling force is usually exerted by a human operator, and since all humans have maximum physical force limitations, the improvement offered by this invention provides dramatic improvement in consumer usability. This new design is of particular benefit in fluid systems which utilize higher pressure fluid levels. High fluid pressure levels exist in most residential or commercial pressured water systems including fluid delivery systems.

In addition, it is understood that whilst the invented valve (containing the sealing member) is particularly useful in quick-connect valve assemblies operated by humans, that its benefits are also applicable in uses of automation such as robots and other automation.

Utilizing a standard cylindrical coordinate system with axial [typical Z direction], radial [typical Euclidean radial distance from Z axis] and circumferential [angular] directions; where the axial direction coincides with the direction 910 and the direction 905; the axis of the axial direction is depicted as line 100 on FIGS. 3, 6, 8A, 8B and 8C; where the radius [R] has a value of zero at the axial [Z] axis 100; hence the resulting circumferential direction coincides with the standard circumferential direction of the co-ordinate system. Direction 200 is perpendicular to the axial direction 100. As depicted in FIG. 6 the Direction 910 and Direction 905 are also defined as the upstream direction and the downstream direction, respectively. The downstream direction is the direction of the flow of fluid in the quick-connect valve assembly.

The invention claimed is:

1. A quick-connect valve assembly for fluid control comprising:

a male coupler having a first central chamber and an upstream end having a flat plane perpendicular to an axial direction of the valve assembly; a female coupler having a second central chamber and an annular sealing surface in the second central chamber; a radial fluid seal between an outer diameter of the male coupler and an inside diameter of the female coupler; a sealing member contained within the female coupler;

wherein the male coupler and the female coupler undergo a coupling process and an uncoupling process, having a coupled state and an uncoupled state; wherein the first central chamber and the second central chamber enables fluid communication; wherein the sealing member is held in a closed position by an internal upstream static pressure within said second central chamber of the female coupler to prevent fluid flow in the uncoupled state;

wherein the sealing member is coaxial with the female housing in the closed position; and wherein the sealing member has a second annular sealing surface plane at an upstream portion perpendicular to the axis of the female coupler in the closed position and a flat plane on the downstream end, the two respective planes forming a constant dihedral angle, wherein during the coupling process the upstream end of the male coupler contacts the downstream end of the sealing member to initially rotate the constant dihedral angle of the sealing member out of coaxial alignment with the female housing by pivoting the second annular sealing surface plane on the annular sealing surface, and then in the fully open position lift the sealing member in the axial direction of the valve assembly out of contact with the annular sealing surface.

* * * * *